C. W. PACKER.
Ice Cream Freezer.
No. 28,402.
Patented May 22, 1860.
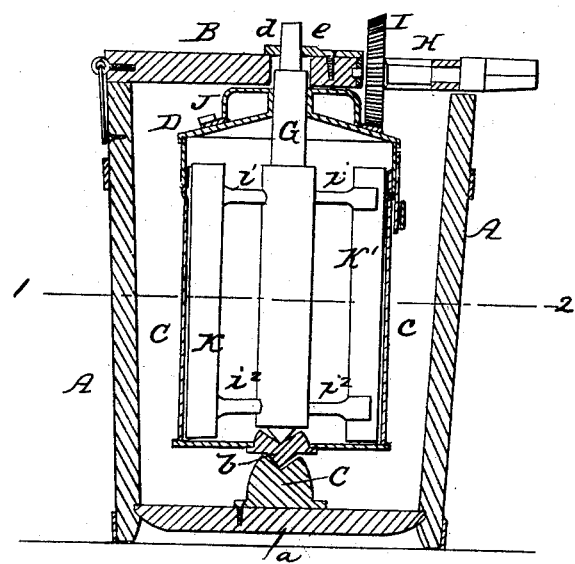
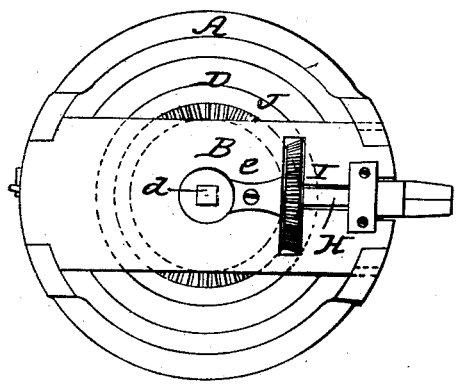
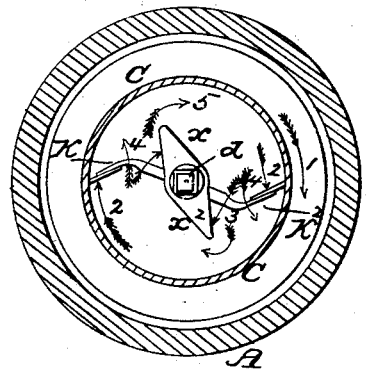
Witnesses
Henry Howson
Horace See
INVENTOR
Chas. W. Packer.

UNITED STATES PATENT OFFICE.

CHARLES W. PACKER, OF PHILADELPHIA, PENNSYLVANIA.

ICE-CREAM FREEZER.

Specification of Letters Patent No. 28,402, dated May 22, 1860.

*To all whom it may concern:*

Be it known that I, CHARLES W. PACKER, of the city and county of Philadelphia and State of Pennsylvania, have invented a new and useful Improvement in Ice-Cream Freezers; and I do hereby declare the following to be a full, clear, and exact description of the same, reference being had to the accompanying drawing and to the letters of reference marked thereon.

My invention consists in the combination of the inner revolving vessel of an ice cream freezer, with certain stationary blades and stationary deflectors arranged and operating in the manner described hereafter so as to cause in the inner vessel continuous eddies of the cream and a continuous removal of the frozen portions of the latter from the sides of the vessel, and a continuous flow of the unfrozen portion toward the sides of the same, thus insuring a rapid conversion of the cream into the desired frozen mass.

In order to enable others to make and use my invention I will now proceed to describe its construction and operation.

On reference to the accompanying drawing which forms a part of this specification, Figure 1, is a vertical section of an ice cream freezer with my improvement. Fig. 2, a plan view, and Fig. 3, a sectional plan on the line 1—2, Fig. 1.

Similar letters refer to similar parts throughout the several views.

A is the outer vessel or casing of an ice cream freezer, $a$ its base, and B a transverse bar connected to the upper edge of the vessel in any convenient manner.

C is the inner vessel having on its under side a pointed projection $b$ resting in a recess in the step $c$ which is secured to the base A of the outer vessel. To the upper edge of the inner vessel is adapted a detachable cover D through which, as well as through the transverse bar B passes the upper end of the vertical shaft G the lower pointed end of which rests in a recess formed in the bottom of the inner vessel.

The square termination of the shaft G passes through a plate $e$ secured to the transverse bar B, in which plate turns one end of the shaft H, the latter turning near its opposite end in a suitable box on the transverse bar and the outer termination of the shaft being square so as to receive any suitable handle. A bevel wheel I on this shaft H gears into a bevel wheel J attached to the cover D of the inner vessel so that the latter is caused to revolve by turning the handle on the square end of the shaft H.

To the vertical shaft and near its upper end are secured two arms $i$ $i$ the form and relative position of which will be best observed on reference to Fig. 3. Two similar arms $i$ $i$ bearing the same relative position to each other are secured to the same shaft near its lower end. To these arms are secured the two angular blades or vanes K and K′ the lower edges of which are nearly in contact with the bottom of the inner vessel the upper edges coinciding with the upper edge of the same vessel and the outer edges being as close as possible to the inside of the vessel without being in actual contact.

To the vertical shaft are secured the two deflectors $x$ and $x'$ one on each side of the shaft and both extending along the same to the same height and depth or thereabout, as the blades K and K′. These deflectors, as observed in the sectional plan Fig. 3, are directly opposite to each other each vane having inclined sides which meet at an edge $y$, the distance between the edges of the opposite deflectors being somewhat less than the diameter of the inner vessel and the position of the deflectors in relation to that of the vanes being as represented in Fig. 2.

The granulated ice having been deposited in the outer vessel, and the cream in the inner vessel a rotating motion is imparted to the latter in the direction of the arrow 1 Fig. 3, by turning the shaft H. The contents of the inner vessel would revolve in the same direction as, and simultaneously with the vessel, but for the stationary blades K and K′ and stationary deflectors $x$ and $x'$. The revolving body of frozen cream nearest to the vessel and represented by the arrow 2, Fig. 3, strikes the inclined blade K and is directed by the latter toward the inclined sides of the deflector $x$, as seen by the arrow 3, in the meantime the inner unfrozen body of cream takes the direction of the arrow 4, toward the side of the vessel while the deflector $x$ directs the body of frozen cream which had previously struck its side, in the direction of the arrow 5. It will thus be seen that as the inner vessel revolves the opposite blades and deflectors cause continuous eddies, removing the frozen cream from the edge of the vesssel toward the center and directing the central body of unfrozen cream toward the side of the vessel, the whole body of cream, in fact, continually changing its position so as to be rapidly reduced to the desired frozen mass.

I claim as my invention and desire to secure by Letters Patent—

The revolving vessel C in combination with stationary inclined blades K and K' and inclined deflectors $x$ and $x'$ the whole being arranged and operating as and for the purpose herein set forth.

In testimony whereof, I have signed my name to this specification, in the presence of two subscribing witnesses.

CHAS. W. PACKER.

Witnesses:
HENRY HOWSON,
CHARLES D. FREEMAN.